J. W. EVANS.
TWO ROW CORN CUTTER.
APPLICATION FILED JAN. 2, 1915.
1,183,065.
Patented May 16, 1916.
2 SHEETS—SHEET 2.
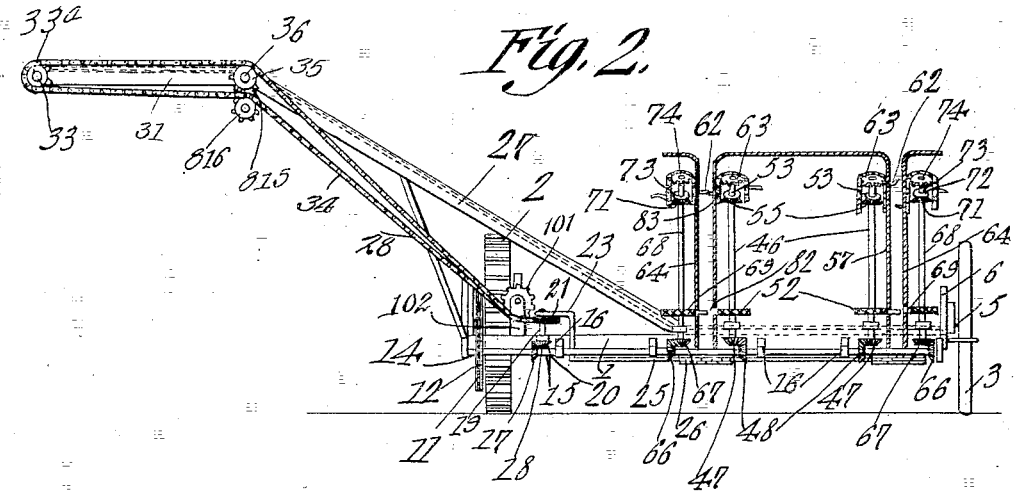
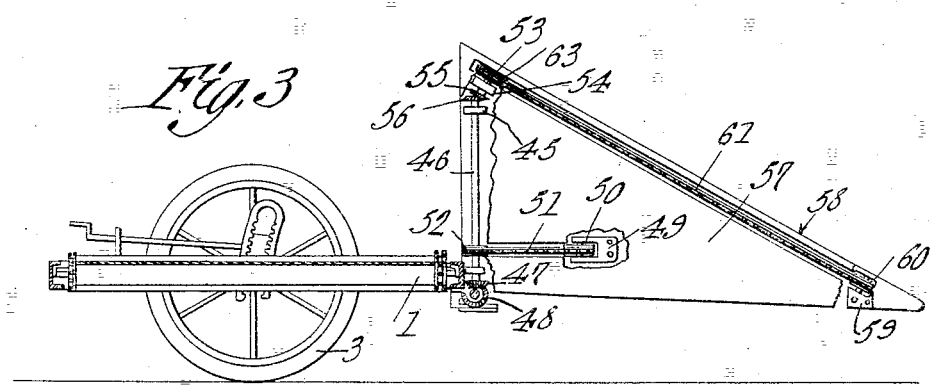
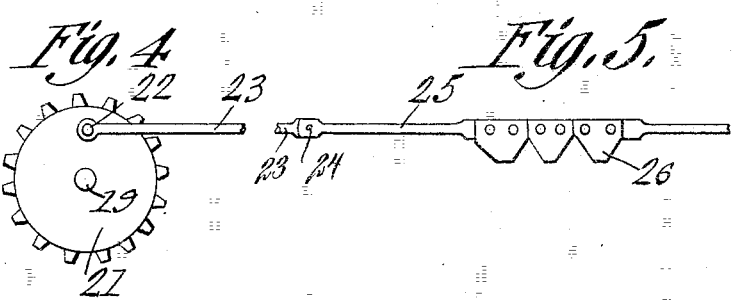
J. W. Evans
Inventor
Witnesses
by
Attorneys

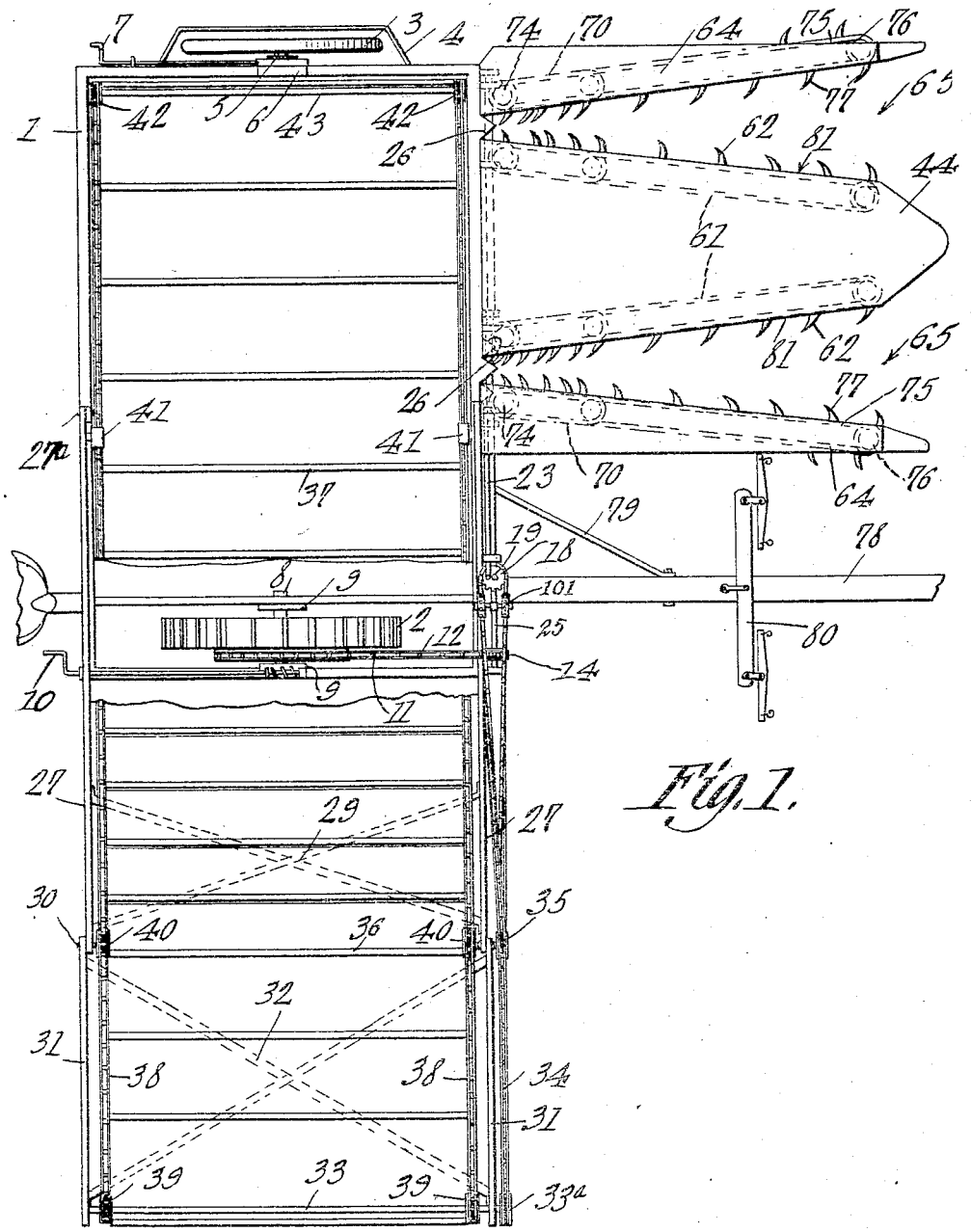

UNITED STATES PATENT OFFICE.

JOB WILLIAM EVANS, OF KIRKSVILLE, ILLINOIS.

TWO-ROW CORN-CUTTER.

1,183,065. Specification of Letters Patent. Patented May 16, 1916.

Application filed January 2, 1915. Serial No. 155.

*To all whom it may concern:*

Be it known that I, JOB WILLIAM EVANS, a citizen of the United States, residing at Kirksville, in the county of Moultrie and State of Illinois, have invented a new and useful Two-Row Corn-Cutter, of which the following is a specification.

The device forming the subject matter of this application is adapted to be employed for cutting two rows of standing corn at once.

Means is provided whereby the standing corn in the respective rows is guided toward the cutting mechanism, means being provided for engaging the standing corn adjacent its butts and at a distance from the ground, so that the corn will move toward the cutting mechanism in vertical positions.

The corn in the two rows is cut by a reciprocating mechanism actuated in a novel manner, the cut corn being deposited upon a conveyer belt which elevates the cut corn and deposits the same to one side of the standing corn which is not yet cut.

The invention aims to improve generally, a machine having means whereby the foregoing operations may be carried out.

It is within the scope of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings:—Figure 1 shows the invention in top plan; Fig. 2 is a vertical section taken transversely of the direction in which the structure moves; Fig. 3 is a vertical section taken longitudinally of the line of travel of the machine; Fig. 4 is a fragmental top plan of the mechanism whereby the cutter bar is actuated; Fig. 5 is a fragmental top plan of the cutter bar.

In carrying out the present invention there is provided a main frame 1 of approximately rectangular form. The invention includes a ground-engaging drive wheel 2 and a ground-engaging supporting wheel 3. The ground-engaging supporting wheel 3 is partially housed in a casing 4 outstanding from one end of the main frame 1. The wheel 3 is carried by a shaft 5 upheld in a bearing 6 mounted to move vertically with respect to the main frame 1, the bearing 6 being controlled by a shaft 7 to effect a raising and a lowering of the main frame.

The shaft of the main drive wheel 2 is denoted by the numeral 8 and is supported in bearings 9 mounted to move vertically with respect to the main frame 1, the bearings 9 being adjusted by means of a shaft 10, to the end that the main frame and parts carried thereby may be raised and lowered.

No specific novelty is claimed for the means for raising and lowering the main frame 1 and since there are many devices adapted to this end, the showing of the drawings, so far as the raising and lowering means is concerned may be considered as typical or diagrammatic, and a detailed description is unnecessary.

Mounted to move with the main ground-engaging drive wheel 2 and driven thereby is a sprocket wheel 11 about which is trained a sprocket chain 12. The sprocket chain 12 is trained around a sprocket wheel 14 mounted on a main shaft 15 extended across the front of the main frame 1 and journaled in bearings 16 thereon. Secured to the main shaft 15 is a beveled pinion 17 meshing into a beveled pinion 18 on the end of an auxiliary shaft 19 journaled in a bearing 20 on the main frame 1. Attached to the auxiliary shaft 19 is a sprocket wheel 21 which, as shown in Fig. 4, carries a crank pin 22 upon which is mounted one end of an offset pitman 23 pivoted as shown at 24 to a knife bar 25 mounted to reciprocate on the forward end of the main frame 1 and provided with sets of knives 26.

It will now be understood that when the drive wheel 2 is rotated by contact with the ground, motion will be transmitted to the sprocket chains 12 by means of the wheel 11 which rotates with the drive wheel 2. The chain 12, through the instrumentality of the sprocket wheel 14 rotates the main shaft 15 and the latter, through the medium of the intermeshing beveled pinions 17 and 18 rotates the auxiliary shaft 19, the sprocket wheel 21 being rotated and the sprocket wheel 21 imparting a reciprocating movement to the knife bar 25 and the knives 26 through the means of the pitman 23 and the crank pin 22. The knife bar 25 operates to cut down two rows of standing corn, the rows of corn being separated by a suitable mechanism to be described hereinafter, and the cut corn being carried laterally by a conveyer mechanism which will now be described.

In carrying out the invention there is provided a conveyer frame embodying side rails 27 pivoted as shown at 27$^a$ to the main frame 1, the side rails 27 of the conveyer frame being sustained by means of braces 28 connected with the main frame 1 as shown most clearly in Fig. 2. The side rails 27 of the conveyer frame may be mutually strengthened and held in parallelism by means of cross braces 29 indicated in Fig. 1. Pivoted as shown at 30 to the extremities of the side rails 27 of the conveyer frame are side rails 31 forming a part of the conveyer frame extension, the side rails 31 being united by cross braces 32. Any suitable means may be provided for holding the conveyer frame extension in vertically adjusted positions. Journaled for rotation in the outer ends of the side rails 31 of the conveyer frame extension is a drive shaft 33, to one end of which is secured a sprocket wheel 33$^a$. A driving sprocket chain 34 is trained around the sprocket wheel 33$^a$ and the upper run of the chain passes across the upper edge of an idler 35 journaled for rotation at the point of juncture between one of the side rails 27 and the corresponding side rail 31, the idler 35 being supported on a stub shaft 36. The stub shaft 36 supports a hanger 815 carrying an idler 816 across the upper edge of which the lower run of the chain 34 passes. The driving sprocket chain 34 is engaged with the sprocket wheel 21 on the shaft 19 and is held in operating engagement therewith by means of idle sprocket wheels 101 carried by standards 102.

It has been pointed out hereinbefore in what manner the auxiliary shaft 19 is rotated and it will now be obvious that when rotation is imparted to the shaft 19 and the sprocket wheel 21, motion will be transmitted to the sprocket chain 34, rotating the drive shaft 33 through the instrumentality of the sprocket wheel 33$^a$. If as is the case in the present embodiment of the invention, a conveyer is operatively assembled with the shaft 33, this conveyer under the action of the shaft 33 may be employed for carrying laterally corn which has been cut by the reciprocating knife bar 25 and its working parts.

The conveyer whereby the cut corn is carried laterally is in the form of a belt denoted generally by the numeral 37, the belt 37 embodying chains 38 engaged around sprocket wheels 39 on the drive shaft 33. The upper run of the conveyer belt 37 or, more specifically, the chains 38 thereof, pass across the upper edges of idlers 40 journaled for rotation at or adjacent to the pivotal connection 30 between the side rails 27 and 31. The sprocket chains 38 of the conveyer belt 37 pass beneath idlers 41 which preferably are journaled on the side rails 27 of the conveyer frame near to the points 27$^a$ at which the said side rails are pivotally connected with the main frame 1. The chains 38 of the conveyer belt 37 pass over sprocket wheels or idlers 42 carried by a shaft 43 journaled on the main frame 1 relatively near to the supporting ground wheel 3.

From what has been stated hereinbefore as to the operation and function of the drive shaft 33, it will be obvious that the latter is adapted to actuate the conveyer belt 37, so that the conveyer belt will receive and carry laterally, the corn cut by the knife bar 25, the location and function of the conveyer belt 37 being readily understandable when Fig. 2 is compared with Fig. 1.

A means is provided for separating the rows of standing corn before the same are cut and for guiding the rows of corn toward the reciprocating knife bar 25. With this end in view a forwardly presented prow 44 is carried in any suitable manner by the main frame 1. As shown best in Fig. 2, the prow 44 is of arched form in transverse section and embodies side walls 57. The upper surface of the prow 44 slants downwardly as clearly shown at 58 in Fig. 3, and as indicated at 81 in Fig. 1, the prow 44 tapers toward its forward end. Journaled for rotation in bearings 45 on the side walls 57 of the prow 44 and located near to the rear end of the prow are upright shafts 46. Secured to the lower ends of the shafts 46 are beveled pinions 47 meshing into beveled pinions 48 attached to the main shaft 15. Brackets 49 are mounted on the side walls 57 of the prow 44, the brackets 49 supporting for rotation, sprocket wheels 50. About the sprocket wheels 50 and about sprocket wheels 52 on the shafts 46 are passed sprocket chains 51 provided with outstanding gathering fingers movable in slots 82 in the side walls 57 of the prow 44. The chains 51 preferably move in a substantially horizontal plane. Inclined shafts 53 are journaled for rotation in bearings 54 on the side walls 57 of the prow 44, the inclined shafts 53 being equipped at their lower ends with beveled pinions 55 meshing into beveled pinions 56 attached to the upper ends of the upright shafts 46. Attached to the side walls 57 of the prow 44, near to the forward end of the prow, as shown in Fig. 3, are brackets 59 supporting sprocket wheels 60. The upper ends of the inclined shafts 53 are provided with sprocket wheels 63, and about the sprocket wheels 60 and 63 are trained chains 61 provided with gathering fingers 62 projecting outwardly through openings 83 in the side walls 57 of the prow 44. The gathering chains 61 are downwardly and forwardly inclined, to correspond with the slope 58 of the prow 44, the sprocket gathering chains 61 being forwardly extended well beyond the gathering chains 51, as indicated in Fig. 3.

Disposed at the sides of the prow 44 are wings 64. These wings and parts carried thereby resemble in general construction the prow 44 and its parts. The description of the wings 64, therefore, may be shortened accordingly. The wings 64 are of arched form and coöperate with the side walls 57 of the prow to define V-shaped entering throats 65. At this point it may be noted that the knives 26 on the reciprocating knife bar operate at the rear end of these V-shaped entering throats. The wings 64 may be upheld in any suitable manner from the main frame 1. The main shaft 15 is provided with beveled pinions 66 meshing into beveled pinions 67 on shafts 68 journaled on the wings 64 and corresponding to the shafts 46 of the prow 44. Each shaft 68 carries a sprocket wheel 69 receiving a short sprocket chain 70 corresponding to the chains 51 and provided with gathering fingers, the forward portions of the gathering chains 70 being supported by mechanisms of the sort previously described and designated by the reference characters 49 and 50. Each upright shaft 68 is provided adjacent its upper end with a beveled pinion 71 meshing into a beveled pinion 72 on an inclined shaft 73 provided with a sprocket wheel 74 receiving an inclined chain 75 provided with gathering fingers and corresponding to the chain 61, the forward portions of the gathering chains 75 being passed around sprocket wheels 76 journaled on the wings 64 adjacent their forward ends. The gathering fingers of the chains 75 are indicated by the reference character 77.

When the shaft 15 is rotated in the manner hereinbefore described, motion is transmitted to the shafts 46 on the prow 44 through the medium of the intermeshing beveled pinions 47 and 48. When the shafts 46 are rotated, the gathering chains 51 and 61 will be operated, the fingers thereon engaging the standing corn and serving to draw the same rearwardly, the chains 51 operating on the corn adjacent the butts thereof. In a similar manner, the inclined gathering chains 75 and the short gathering chains 70 on the wings 64 will be actuated by means of the shafts 68 and the intermeshing beveled pinions 66 and 67, the inclined shafts 53 and parts carried thereby forming an operative connection between the shafts 46 and the sprocket chains of the prow 44 and the inclined shafts 73 of the wings 64 coacting with the sprocket chains on the wings in a manner which will be obvious when Fig. 3 is noted.

The main frame 1 may be provided with a forwardly extended tongue 78 of any desired sort, held in proper position by means of the frame engaging brace 79, the tongue 78 carrying shaft rigging 80 of any desired form.

The operation of the structure has been dealt with in detail hereinbefore, but briefly considered is as follows:—The knife bar 25 is reciprocated from the main ground-engaging drive wheel 2 by means of the pitman 23, the sprocket wheel 21, the shaft 19, the shaft 15 and the sprocket chain 12. When the shaft 15 thus is rotated, the gathering chains on the prow 44 and on the wings 64 will be actuated, respectively by the shafts 46 and 68 and attendant parts. The conveyer belt 37 is driven from the sprocket wheel 21 on the shaft 19 by means of the sprocket chain 34 and the drive shaft 33.

From the foregoing it will be obvious that there is disclosed in this application a comparatively simple mechanism whereby two rows of standing corn may be cut at once, the corn in the two rows being guided into proper relation with respect to the reciprocating cutting mechanism, the corn after having been cut being deposited upon a conveyer, which, being actuated from one of the ground wheels of the machine carries the cut corn laterally into an out-of-the-way position.

Having thus described the invention, what is claimed is:—

1. In a machine of the class described, a main frame; a ground wheel carried thereby; a prow carried by the frame, the prow being of arched form in transverse section and embodying side walls and a top, the prow having a point at its forward end, the top slanting downwardly to the point; bearings on the side walls of the prow near its rear end; drive shafts journaled in the bearings; other bearings on the side walls of the prow above the first specified bearings; driven shafts journaled in said other bearings and disposed at obtuse angles to the drive shafts; intermeshing beveled pinions on the driving and driven shafts; gathering chains operatively connected with the driven shafts, the gathering chains being disposed substantially parallel to the top of the prow; means on the prow adjacent its forward end for mounting the gathering chains; wings assembled with the main frame and located on opposite sides of the prow; gathering chains mounted on the wings; a cutter mounted to move at the bases of the wings and the prow; and means for connecting the cutter, the gathering chains of the wings and the drive shafts of the prow operatively with the ground wheel.

2. In a device of the class described, a main frame; a ground wheel carried thereby; a horizontal shaft journaled on the frame; means for operatively connecting the horizontal shaft with the ground wheel; a corn guiding means carried by the frame; a cutter bar mounted to reciprocate at the base of the corn guiding means; a vertical auxiliary shaft journaled on the frame; beveled pinions connecting the shafts; a sprocket wheel carried by the auxiliary shaft; a pitman forming a connection between the sprocket wheel and the cutter bar; a conveyer support projecting from the main frame; a conveyer mounted to traverse the support; and a driving means for the conveyer including a sprocket chain trained around the sprocket wheel on the vertical auxiliary shaft.

In testimony that I claim the foregoing as my own, I have hereto affixed my signature in the presence of two witnesses.

JOB WILLIAM EVANS.

Witnesses:
Isaac Hudson,
Chas. F. Selby.